June 7, 1949.  C. E. COCHRAN  2,472,646
SPEED CONTROL FOR INDUSTRIAL TRUCKS OR THE LIKE.
Filed July 9, 1945

INVENTOR.
CLYDE E. COCHRAN.
BY Fay, Golrick & Chitton.
Attorneys.

Patented June 7, 1949

2,472,646

UNITED STATES PATENT OFFICE 2,472,646

SPEED CONTROL FOR INDUSTRIAL TRUCKS OR THE LIKE

Clyde E. Cochran, Cleveland, Ohio, assignor to The Elwell Parker Electric Company, Cleveland, Ohio, a corporation of Ohio Application July 9, 1945, Serial No. 603,977

5 Claims. (Cl. 318—305)

1

The present invention relates to industrial trucks and more particularly to an improvement in the speed control of electrically driven trucks or the like. More specifically, the present invention relates to a speed control that is an improvement over that disclosed in my United States Patent 2,338,097.

In my patent referred to, the industrial truck shown herein had a direct current motor having two field windings each having an equal number of turns. Three distinct speed steps were obtained by the provision of a switching mechanism having a manually operable speed control member which when moved to the slow speed position would connect the two field windings of the motor in series with one another and also in series circuit with a resistance. When the controller member was moved to the second speed position the resistance was shorted out and the two field lines were maintained connected in series. When the control lever was shifted to the third speed position, which was the top speed, the two field windings were placed in parallel circuit relation, and in the process of changing the field windings from series to parallel, i. e., from the second to third speed, the switch mechanism operated to first disconnect one-half of the field of the motor, that is, one field winding before the parallel circuit relation was established. This disconnection of half of the field had no effect on the speed of the motor, however.

An object of the present invention is to provide a fourth speed step in the control of industrial trucks of the type described, or the like, which speed steps may be effected by the switching mechanism disclosed in my patent referred to hereinbefore.

Another object of the invention is to provide a driving mechanism for an electrically driven industrial truck in which the acceleration between the speed steps is substantially uniform.

Still another object of the invention is to provide a driving mechanism for an electrically driven industrial truck which is controlled by a switching mechanism, and the arcing and heating of the switching mechanism is minimized whereby lighter switching parts may be utilized without increasing the heating thereof or the burning contacts.

In carrying out my invention, I provide two field windings for opposite poles of the motor, which motor is preferably wave wound, but the number of turns in the windings are unequal, preferably having a ratio of approximately 2 to 1, although other ratios may be used. In shorting

2 out the shorter field winding in changing the winding circuits from series relation to parallel, only the winding having the greater number of turns is maintained in the motor in the circuit so that a third speed step is provided intermediate the second speed and third or top speed formerly obtained in the system shown in my patent mentioned previously. When the switching mechanism is actuated to the fourth speed or top speed, the long and short windings are in parallel circuit, thus increasing the current in the armature without a corresponding increase in the field so that a fourth and top speed step is thereby provided without changing the construction or arrangement of the switching mechanism.

Other objects and advantages of my invention will be apparent from the following detailed description of a preferred form of embodiment of my invention, reference being had to the accompanying drawing wherein—

Figure 1:
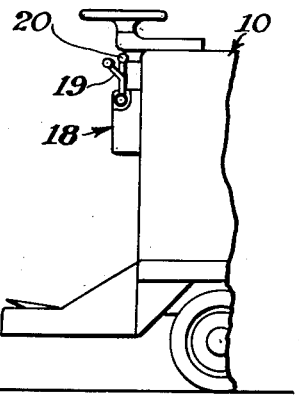
Fig. 1 is a side view in elevation of one end of an industrial truck embodying my invention.

Referring now to the drawings, I have shown an industrial truck 10 that is adapted to be driven by a series wound, direct current motor which is driven by current from a suitable storage battery, although any other suitable source could be employed as well. The motor includes an armature 12 and two field windings 13 and 14. Preferably, the armature is wave wound, and the field winding 13, for example, has a fewer number of turns than the field winding 14. Also opposite poles are wound with an equal number of turns, but the poles of the opposite field will have an unequal total number of turns. It is to be understood that the number of turns in the windings may be varied somewhat, but in the present embodiment of the invention, I prefer that the winding 13 consist of 24½ turns and that the winding 14 consist of 49 turns. With an 18-cell lead battery a very desirable and uniform range of speeds may be obtained. Other ratios have been employed, however, such as 19½ turns to 41 turns, and 16 turns to 49 turns. The armature is preferably wave wound so that there will be no undesirable effect of unbalanced flux values, and as opposite poles are excited by equal turns there is no mechanical unbalanced effect.

The direction and speed of the motor for the truck 10 may be controlled by the operator by switching mechanism indicated generally at 18, which mechanism includes a speed control 19 and a reverse lever 20. The switching mechanism 18 is fully disclosed in my patent referred to hereinbefore, and it is unnecessary to describe the details thereof at this time.

Figure 2:
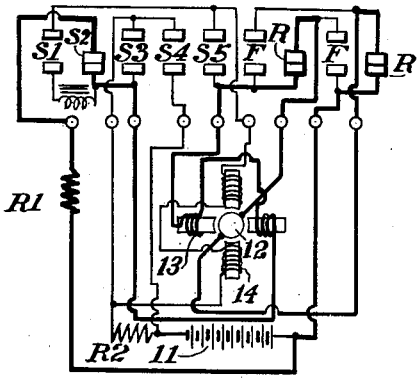
Fig. 2 is a diagrammatic illustration of the motor circuit and contact mechanism for the speed control of the truck shown in Fig. 1, the contact mechanism being shown in the "off" position.

Referring to Fig. 2, the circuit for the motor, including the switching mechanism 18, is shown diagrammatically to illustrate the motor circuit when the speed control lever 19 is moved to the "off" position and the reverse lever 20 is moved to the neutral position. The contacts S1, S2, S3, S4 and S5 are adapted to be actuated by the speed control lever 19 and the two sets of contacts F and R are adapted to be actuated by the reverse lever 20, the contacts F being closed when the lever 20 is moved to the forward position and the contacts R when the lever is moved to reverse position. It will be noted that when lever 19 is moved to the "off" position all contacts are open except S2. The motor control circuit includes a dynamic braking arrangement whereby the speed of the truck may be reduced by causing the motor to act as a generator. For example, if the truck is rolled forward and it is desirable to brake its momentum, the lever 19 is moved to the "off" position, and lever 20 is moved to the reverse position for closing contacts R. When this occurs the circuit indicated in heavy lines will be established and the motor will act as a generator and the current so generated is dissipated by the resistance R1. If the truck is rolling in the opposite direction, its speed may be checked in a similar manner by throwing lever 19 to the "off" position and moving lever 20 to the "forward" position.

Figure 3:
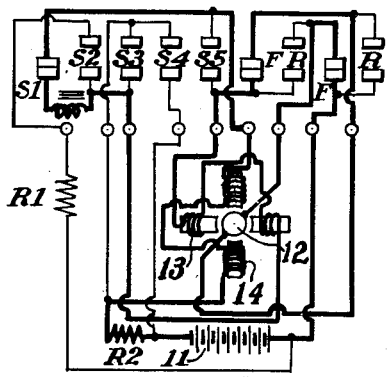
Fig. 3 is a view similar to Fig. 1, but showing the contact mechanism in the low or first speed position.

Referring to Figs. 3 to 6, the circuits for effecting four different steps of speeds of the motor are illustrated diagrammatically. Referring to Fig. 3, the motor circuit is shown when the speed control lever is moved to the first speed step and the reverse lever 20 is moved to the forward position. The heavy lines indicate the path of the current and it will be observed that the windings 13 and 14 are connected in series circuit relation and they are also connected in series with a suitable resistance R2 so that a relatively low speed is obtained.

Figure 4:
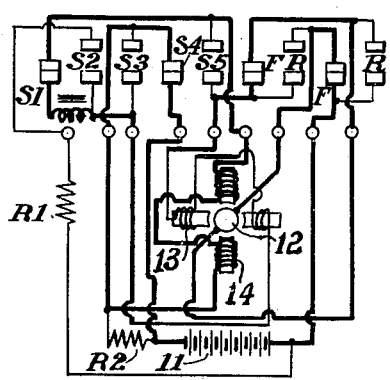
Fig. 4 is a view similar to Fig. 1, but showing the contact mechanism in the second speed position.

Referring to Fig. 4, the motor circuit is shown when the speed control lever 19 is moved to the second speed position and the lever 20 set for forward speed. The heavy lines indicate the circuit, and it will be noted that the resistance R2 is shunted or short circuited by the closure of contacts S4 and that the windings 13 and 14 are retained in series circuit. The omission of R1 from the circuit increases the current in the motor with a consequent increase in speed.

Figure 5:
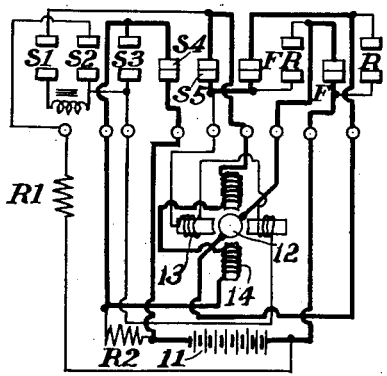
Fig. 5 is a view similar to that of Fig. 2, but showing the contact mechanism in the third speed position.

Referring to Fig. 5, the motor circuit is shown when the speed control lever is moved to the third speed position and reverse lever 20 is in the forward position. It will be noted that winding 13 is disconnected from circuit by the opening of contact S1 and that the field winding 14 alone is in series with the armature 12. This produces a third speed which is slightly greater than the second speed as the resistance of coil 13 is removed and also the flux density of the field is decreased.

Figure 6:
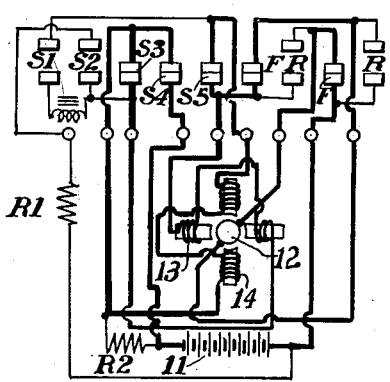
Fig. 6 is a view similar to Fig. 2, but showing the contact mechanism in a fourth or top speed position.

Referring to Fig. 6, the circuit for the motor is shown diagrammatically to illustrate the circuit when the speed control lever 19 is moved to the fourth or top speed position while the reverse lever 20 is in the forward position. It will be observed that the windings 13 and 14 are now connected in parallel circuit with one another and in series with the armature 12, and by this circuit the energization of the armature is increased without a corresponding increase in the flux of the field so that a distinct fourth increase in speed is obtained.

Tests have shown that a loaded truck in which the coils 13 and 14 have 24½ to 49 turns, respectively, the speed of the truck in the first speed position will be approximately 1.9 miles per hour; in the second speed position a speed of 3.2 miles per hour; the third speed, a speed of 3.7 and in the fourth speed a speed of 4.4 miles per hour. The same truck with no load at the speeds of 3.1 or first speed; 4 miles per hour for the second speed; 4.8 miles per hour for the third speed and 5.5 miles per hour for the fourth speed. It will be observed that the speed steps thus obtained are substantially uniform and that the speeds are such as to be desirable for use in congested areas and that the operator is provided with a maximum range of speeds, each step of speed having approximately the same difference over adjacent steps.

It is to be understood that the same speed steps may be had when the lever 19 is moved to the reverse position, the only difference being in the change of direction of the flow of current through the motor circuits. It will be apparent that by my invention, I have provided a novel speed control for an electrically driven industrial truck in which greater flexibility in operation of the truck may be had by the provision of a greater range of speed steps. This increased speed range is obtained by a relatively simple expediency and requires no additional control equipment over that described in my aforementioned patent.

Although I have described a preferred form of embodiment of my invention, it is to be understood that the invention may be embodied in other forms, all of which fall within the scope of the claims which follow.

I claim:

1. In an industrial truck or the like, driving mechanism for said truck including a series wound electric motor having two field windings, one of said windings having a substantially greater number of turns than the other of said windings; a source of electric energy for said motor; and means for controlling the speed of the motor, said means including a manually operable control member, and being operable to consecutively connect said windings in series, to render one of said windings only effective and then to connect said windings in parallel as said control member is moved consecutively through three speed control positions.

2. In an industrial truck or the like, driving mechanism for said truck including a series wound electric motor having two field windings, one of said windings having a substantially greater number of turns than the other of said windings;

a source of electric energy for said motor; and means for controlling the speed of the motor, said means including a manually operable control member and being operable to consecutively connect said windings in series, to render said one winding only effective and then to connect said windings in parallel as said control member is moved consecutively through three speed control positions.

3. In an industrial truck or the like, driving mechanism for said truck including a series wound electric motor having two field windings, one of said windings having a substantially greater number of turns than the other of said windings, the ratio of turns of said windings being approximately forty-nine to twenty-four and one-half; a source of electric energy for said motor; and means for controlling the speed of the motor, said means including a manually operable control member and being operable to consecutively connect said windings in series, to render one of said windings only effective and then to connect said windings in parallel as said control member is moved consecutively through three speed control positions.

4. In an industrial truck or the like, driving mechanism for said truck including a series wound electric motor having two field windings, said windings being disposed on two opposite poles, each pole having an equal number of turns thereon, one of said windings having a substantially greater number of turns than the other of said windings; a source of electric energy for said motor; and means for controlling the speed of the motor, said means including a manually operable control member and being operable to consecutively connect said windings in series, to render one of said windings only effective and then to connect said windings in parallel as said control member is moved consecutively through three speed control positions.

5. In an industrial truck or the like, driving mechanism for said truck including a series wound electric motor having two field windings, one of said windings having a substantially greater number of turns than the other of said windings, a source of electric energy for the motor; and means for controlling the speed of the motor, said means including a manually operable control member, and being operable to consecutively connect said windings in series, to render the longer of said windings only effective and then to connect said windings in parallel as said control member is moved consecutively through three-speed control position.

CLYDE E. COCHRAN.

REFERENCES CITED

The following references are of record in the file of this patent:

UNITED STATES PATENTS

| Number | Name | Date |
|---|---|---|
| 1,996,476 | Krause | Apr. 2, 1935 |
| 2,338,097 | Cochran | Jan. 4, 1944 |